April 24, 1973  C. W. GREENE  3,729,365
ENDLESS REINFORCEMENT AND METHOD FOR PRODUCING SAME
Filed Sept. 3, 1970  4 Sheets-Sheet 1
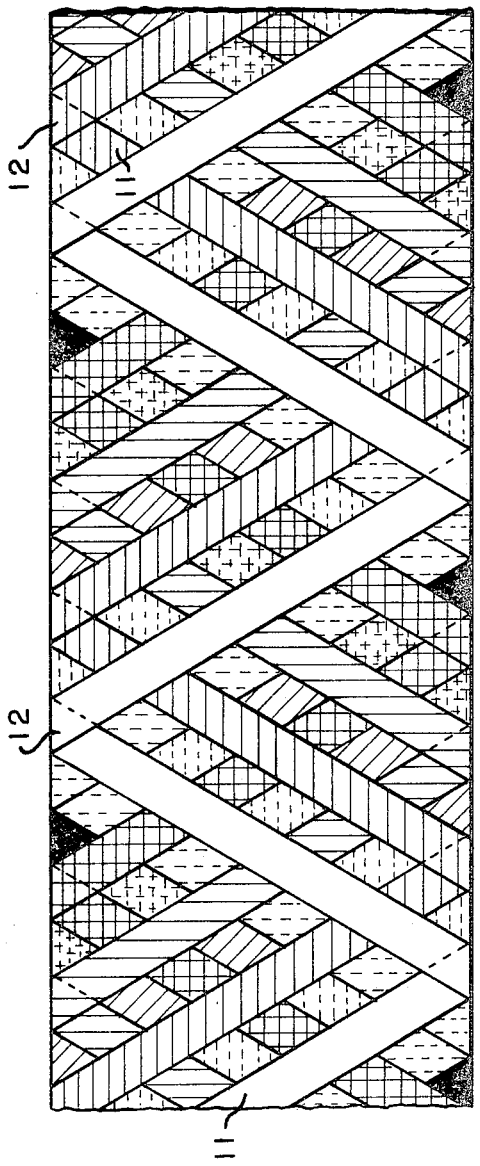
FIG. -1-
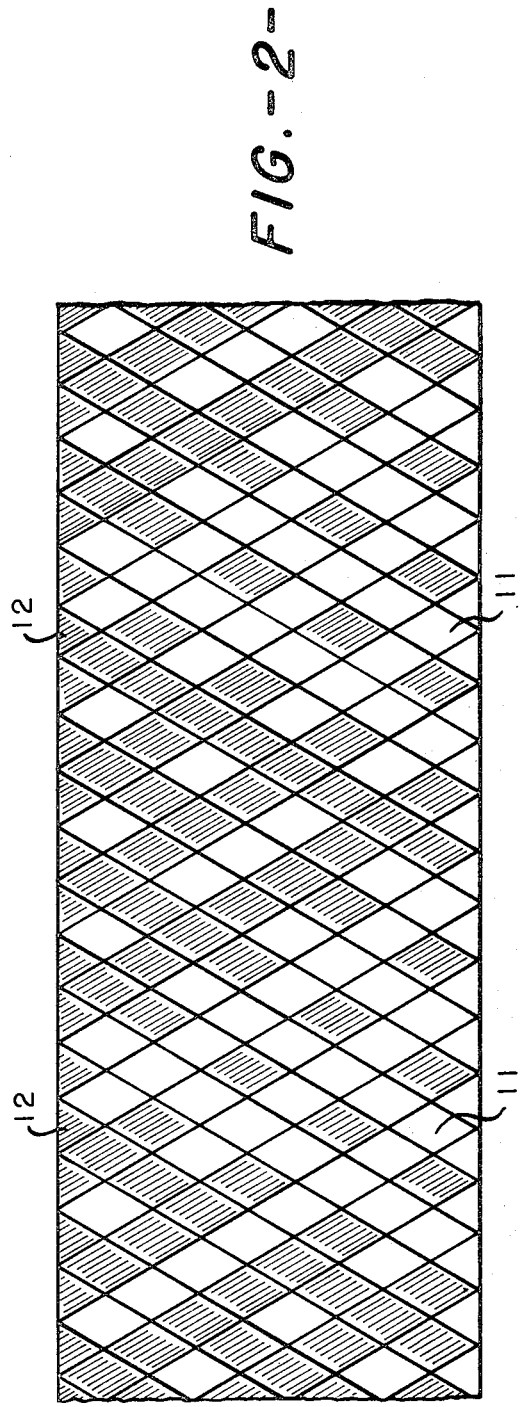
FIG. -2-
INVENTOR.
CHARLES W. GREENE
BY
*Arthur L. Urban*
ATTORNEY April 24, 1973    C. W. GREENE    3,729,365
ENDLESS REINFORCEMENT AND METHOD FOR PRODUCING SAME
Filed Sept. 3, 1970    4 Sheets-Sheet 2
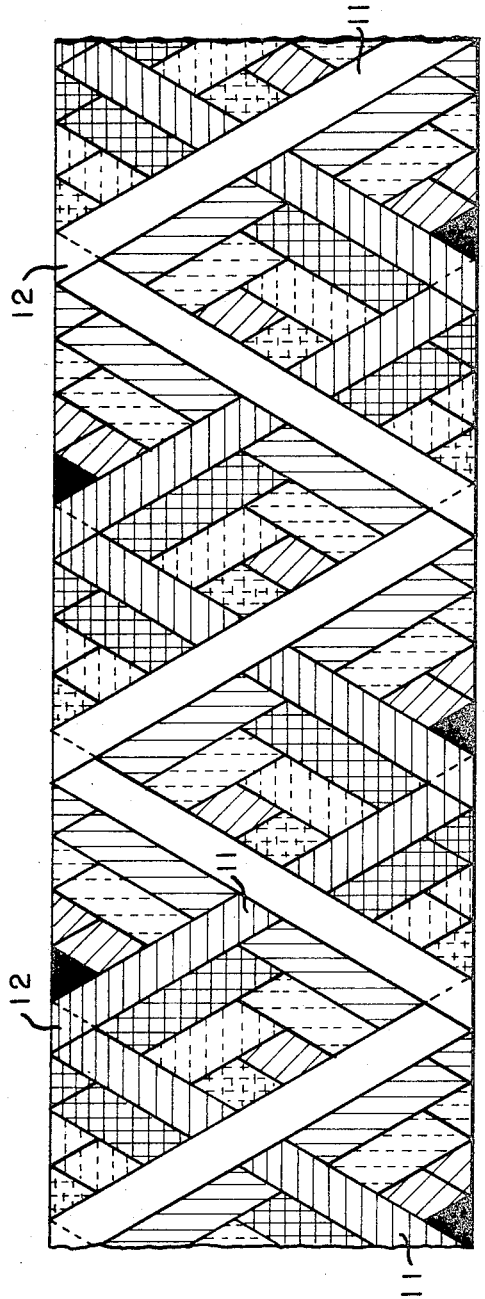
FIG. -3-
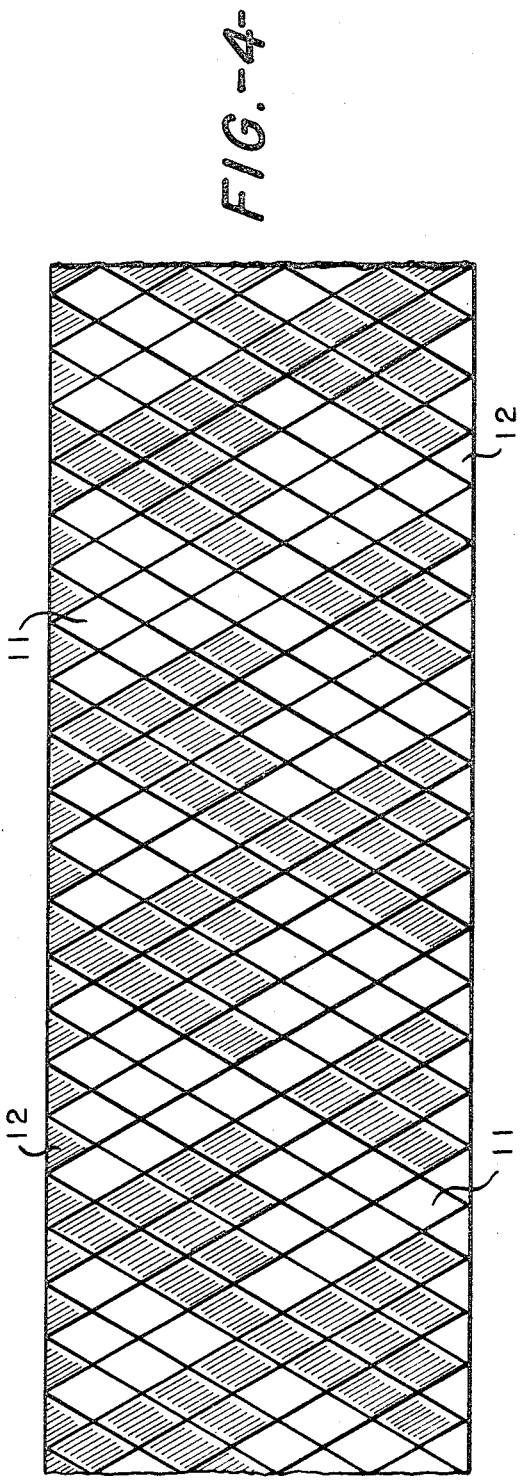
FIG. -4-
INVENTOR.
CHARLES W. GREENE
BY
ATTORNEY April 24, 1973 C. W. GREENE 3,729,365
ENDLESS REINFORCEMENT AND METHOD FOR PRODUCING SAME
Filed Sept. 3, 1970 4 Sheets-Sheet 3
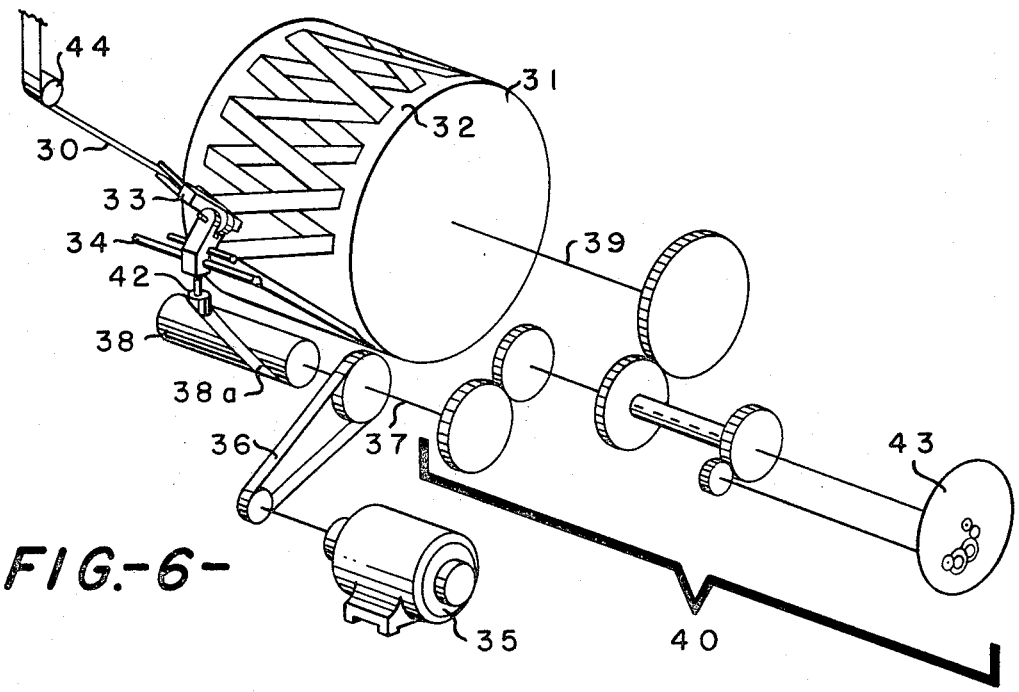
FIG.-6-
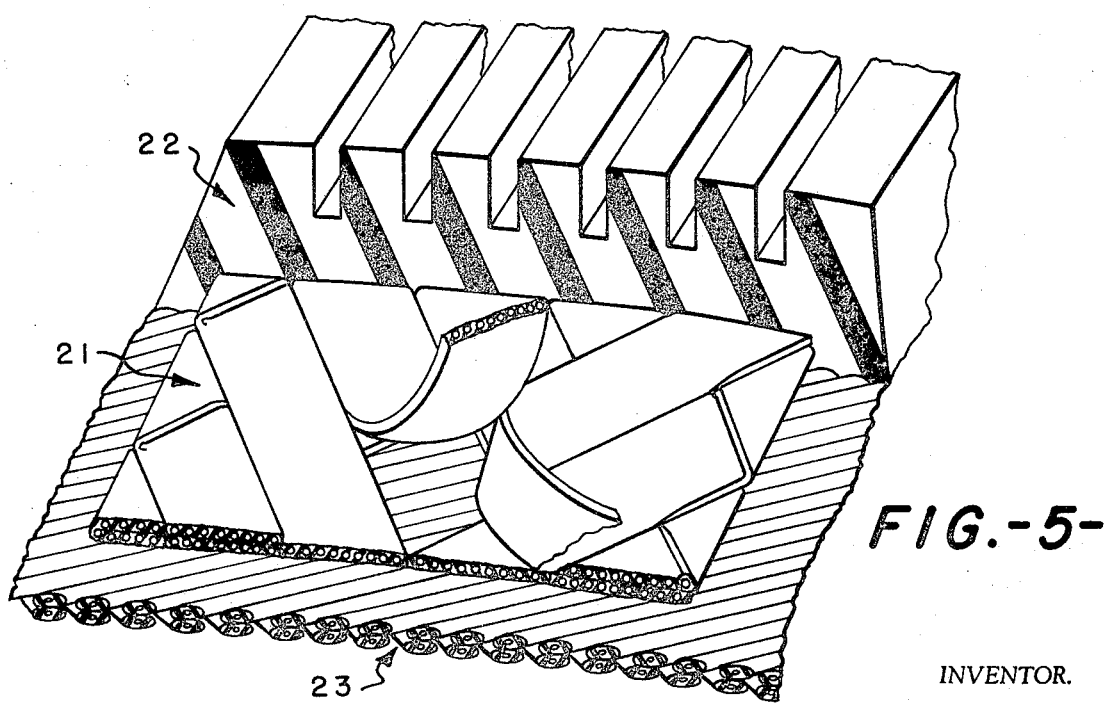
FIG.-5-
INVENTOR.
CHARLES W. GREENE
BY
ATTORNEY

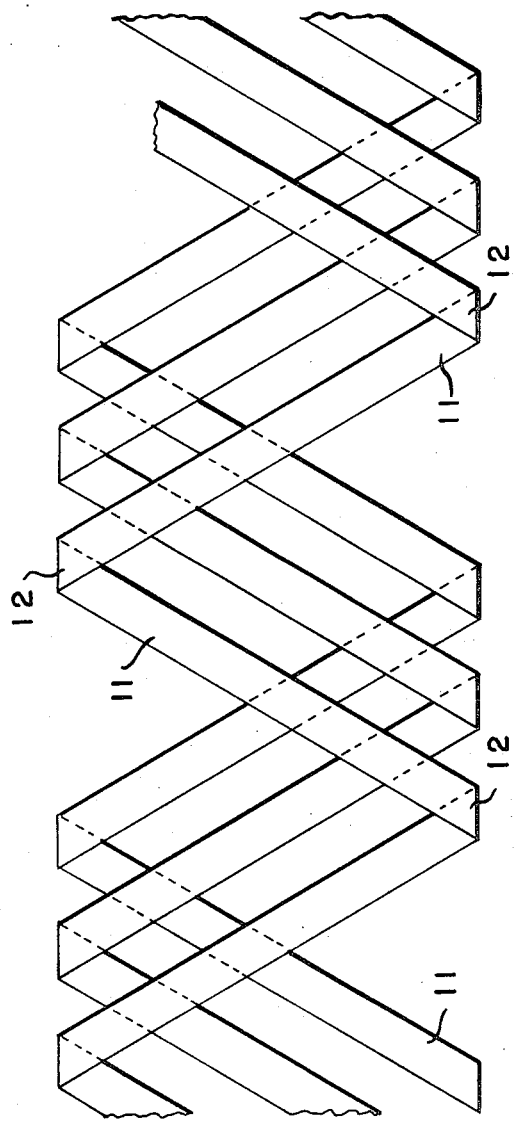

United States Patent Office 3,729,365
Patented Apr. 24, 1973

3,729,365
ENDLESS REINFORCEMENT AND METHOD
FOR PRODUCING SAME
Charles W. Greene, Spartanburg, S.C., assignor to Deering Milliken Research Corporation, Spartanburg, S.C.
Filed Sept. 3, 1970, Ser. No. 69,348
Int. Cl. B32b 5/12
U.S. Cl. 161—57
19 Claims

ABSTRACT OF THE DISCLOSURE

An endless reinforcement which comprises a unitary strip including a multiplicity of continuous cords, the strip positioned across the width of the reinforcement from one side to the other at an angle to the edges of the reinforcement with successive lengths of the strip being folded with respect to each other at the edges to form a generally zigzag pattern. Also, a method for producing such a reinforcement and a tire therewith as well as the resulting tire.

---

The tire industry recently has developed considerable interest in tire constructions which include an annular reinforcement belt or breaker about the periphery of the tire between the tread and the carcass. Such belted tires have the advantage of better road stability and longer tread life both in radial and bias ply constructions.

The reinforcement belts generally are formed of inextensible thread or cord coated with or embedded in a suitable insulating material such as rubber, plastic or some other resinous material. The cords usually are disposed in a pattern in which portions thereof extend in different directions to each other and in directions biased with respect to the longitudinal axis of the belt. This may be accomplished by bias cutting woven fabric which has been calendered with a layer of unvulcanized rubber. Since such belts of necessity are spliced and have a large number of cut ends at each edge of the belt, it has been proposed to form reinforcing belts by winding one or more continuous lengths of cord onto a rotating drum while employing a reciprocating guide to traverse the drum surface and to lay the cord in a generally zigzag pattern thereon. Examples of such belts are disclosed in U.S. Pats. Nos. 2,982,327 and 3,422,874.

Prior to the application of the cord to the surface, the cord may be coated or wrapped with an unvulcanized rubber coating which is quite tacky to provide a pressure sensitive adhesive affinity between adjacent cords and also to separate adjacent cords. However, even with this rubber separation, under certain conditions cord to cord contact may be produced during the formation of the belt and/or tire. This is particularly undesirable with metal wire and also with fiber glass which is the present industry-accepted material for use in such belts. It is well known that these cords severely abrade when adjacent threads or cords are rubbed or impacted against one another.

The present invention provides a novel endless reinforcement for tires, belts and the like which has advantages and benefits over known reinforcements. Also, the invention provides a novel method for producing such reinforcements.

The endless reinforcement of the present invention comprises a unitary strip including a multiplicity of continuous cords with the strip being positioned across the width of the reinforcement from one side to the other at an angle to the edges of the reinforcement with successive lengths of the strip being folded with respect to each other at the edges to form a generally zigzag pattern.

The endless reinforcement usually is of a generally cylindrical form or configuration and is made from conventional tire cord materials such as fiber glass, rayon, polyester, nylon, cotton, metal wire and similar type cords, although the benefits and advantages of the invention are particularly apparent with materials such as fiber glass, metal wire, etc., which are easily abraded or degraded by cord to cord contact. The dimensions of the reinforcement may be varied over a considerable range depending upon the ultimate use thereof. For example, with reinforcements which are to be applied to tire carcasses in flat band form, the circumference will be considerably smaller than the final circumference in the finished tire. Likewise, the original width will be substantially larger than the final width. This is due to the fact that during the expansion step in the forming of the tire, the circumference of the reinforcement generally will be substantially increased and the width will be significantly reduced. During this expansion, the angle of the cord across the width of the reinforcement from one side to the other as measured from the edge will usually be reduced substantially. With reinforcements which are applied to a carcass that has already been formed into the shape of a torus, i.e., a doughnut shape similar to that of the final tire, the dimensions will be about the same in the original form as applied to the carcass and in the final size in the finished tire.

As pointed out above, the endless reinforcement of the invention is formed from a unitary strip including a multiplicity of continuous cords associated with rubber, plastic or a similar material. Although the configuration of the strip generally is rectangular with the cords in a single plane and equally spaced from each other, the cords may be unequally spaced and/or disposed in more than one plane. Also, the cords may be of different sizes or different materials, e.g., the end cords may be rayon with the intermediate cords being metal wires or other combinations of different cords. Likewise, heavier rubber coatings may be used at certain portions across the width of the strip or along the length thereof as desired. While the strip generally will have a smooth outer rubber surface, indentations or openings through the strip may be utilized.

The strip advantageously is formed by passing a plurality of cords in the desired spaced relationship through an extruder, although other methods may be employed. For example, a number of parallel cords or a cord fabric may be calendered with rubber and then slit into strips of the desired width. In addition, the strip may be formed by coating a plurality of cords with a rubber latex in a multiple dip operation to form a unitary strip. Prior to the formation of the reinforcement, the rubber of the strip may be partially or totally vulcanized.

The width of the strip may vary over a considerable range and generally is between about ½ and 2½ inches and preferably between about 1 and 2 inches to facilitate convenient handling and reinforcement construction. The particular width selected will depend upon belt size and the reinforcement pattern desired. For example, with some applications such as large off-the-road machinery, the strip width may be up to 6 inches or more. The maximum width of the strip is not more than about ⅕ of the perpendicular spacing between adjacent parallel lengths of the strip which are connected by an intermediate strip length disposed at a substantially different angle. The maximum strip widh also may be expressed as 40% of the product of the width times the cosine of the angle between the edge of the strip and an edge of the reinforcement.

The employment of the unitary strip permits closer cord spacing than is ordinarily attainable when reinforcements are made from single cords. Thus, cord spacing of about 18 to 30 or 40 cords per inch of strip width may be employed, depending upon cord size, without cord to cord contact occurring in the reinforcement. However, wider cord spacing of 10 cords per inch or less may be advantageous under some conditions.

The reinforcement preferably is formed from a minimum number of strips so that the number of cut ends in the reinforcement is negligible. If the complete reinforcement is formed from a single continuous strip, the ends of the single strip are the only cut ends in the reinforcement. With certain reinforcement designs, it may be desirable to form the reinforcement from more than one strip with each strip being of the same or different width and length. This facilitates the production of a reinforcement in a shorter period of time and/or produces a reinforcement with a different pattern. Such patterns may be desired to produce belts having particular characteristics such as a high degree of longitudinal symmetry and the like. In either construction, the reinforcement of the invention is endless, thus eliminating overlapping or splices which can lead to imbalance and possible premature failure of a tire.

The strip is positioned across the width of the reinforcement from one side to the other at an angle to the edges in the generally zigzag pattern. With reinforcements intended to be expanded, the initial angle of the strip and the cord therein is generally in the range of about 50° to 80° and preferably about 50° and 60° as measured from an edge of the reinforcement. During expansion, the angle of the strip and cord usually will be reduced to an angle in the range of about 5° to 35°. With a reinforcement which is applied to a carcass after the carcass has been expanded, the angle is generally in the range of about 5° to 35°, that is, about the same angle as the final angle after expansion. It may be desirable with certain constructions to provide a change in the angle of the strip and/or cord across the width of the reinforcement. Thus, the angle in portions of the strip adjacent to the edges of the reinforcement may be greater or less than the angle in the center portion. Such a construction may be advantageous where different reinforcement expansion characteristics are desired for particular shapes or types of tires.

As pointed out above, in the reinforcement of the invention, the strip is folded at the edges of the reinforcement. Upon folding of the strip, the succeeding length of the strip is positioned in the zigzag pattern at approximately the same angle with respect to one edge as the previous length of strip prior to the fold is with respect to the opposite edge. This provides a symmetrical cord position in the final reinforcement and minimizes the possibility of imbalance in the tire. If desired, the strip can be preconditioned, e.g., prefolded, prior to the formation of the endless reinforcement.

The strip may be associated with a green or unvulcanized rubber layer to form the reinforcement. This may be accomplished by forming the strip in its generally zigzag pattern over the surface of such a rubber layer or band. Also, a rubber layer may be placed over the outer surface instead of or together with a second rubber layer on the inside thereof. It may be desirable in some constructions to provide rubber shoulder portions adjacent the edges of the reinforcement. Such shoulder portions can be used alone or in combination with one or more rubber layers. The shoulder portions assist in the elimination of entrapped air and in the positioning of the reinforcement with respect to the carcass so that the edges will be properly disposed in the final tire in relation to the center portion of the reinforcement. Such shoulder portions are particularly useful in the production of tires in which it is desirable that the reinforcement be disposed equidistant from the tread surface at all points across the width thereof.

The reinforcement of the invention made with a unitary strip containing a multiplicity of cords provides a novel structure with a reduced number of cross-overs, that is, points at which a cord transfers from one surface of the reinforcement to another, adjoining a cord transferred in the opposite direction. This reduction in cross-overs is particularly important in reinforcements employing cord elements which may be damaged by cord to cord contact. A further advantage of the structure of the invention is that the transfer of the strip from one surface of the reinforcement to the other does not result in any significant thickening of the belt cross section as may occur with single cord reinforcements. Also, the use of a unitary strip decreases the production time for a reinforcement as compared with single cord constructions. In addition, the cord spacing may be significantly decreased without increasing production time.

The invention will be further illustrated with reference to the accompanying drawings, in which:

FIG. 1 is a schematic illustration of one embodiment of an endless reinforcement of the invention showing a portion of the strip pattern;

FIG. 2 is a schematic illustration of the reinforcement of FIG. 1 with cord direction within the strips shown;

FIG. 3 is a schematic illustration of another embodiment of an endless reinforcement of the invention showing a portion of the strip pattern;

FIG. 4 is a schematic illustration of the reinforcement of FIG. 3 with cord direction within the strips shown;

FIG. 5 is a fragmentary schematic view of a tire including an endless reinforcement of the invention;

FIG. 6 is a schematic illustration of one form of apparatus for forming an endless reinforcement of the invention; and FIG. 7 is a schematic illustration of the pattern of the partially formed reinforcement of FIG. 1.

Portions of typical endless reinforcements in accordance with the invention are shown in FIGS. 1–4 and 7 of the drawings. The reinforcement illustrated in FIGS. 1, 2 and 7 is similar to the one shown in FIGS. 3 and 4 except that the circumference is different. The angle of the strip in each case is approximately 60°, the strip width about 1.1 inches and the reinforcement width about 9.8 inches. However, it will be seen that the pattern is changed considerably from one reinforcement to the other. As shown in the figures, a strip 11 is disposed in a zigzag repeating pattern with succeeding lengths of the strip being displaced from each other. The reversal points or folds 12 at the edges of the reinforcement are also clearly seen from these figures. FIGS. 2 and 4 show the direction of the cords in the strip with the lined portions representing cords in one direction and the blank portions representing cords in the other direction.

In FIG. 5 showing a tire including a reinforcement of the invention, the reinforcement 21 is disposed within the carcass between the tread 22 and carcass plies 23.

As shown in FIG. 6, one form of apparatus for forming the reinforcement of the invention includes a rotatable winding drum 31 having a generally cylindrical outer surface 32 providing a supporting surface for cord strip 30 to be positioned thereon. Associated with the drum 31 is guide means 33 mounted for movement on rod 34 for laying strip 30 in a desired zigzag pattern on drum surface 32. Drum 31 and guide means 33 are driven by a power source shown as motor 35. Motor 35 is drivingly connected through a belt and pulley arrangement 36 to a rotatable shaft 37. Shaft 37 is connected to a barrel cam 38 and to drive shaft 39 for drum 31 through a suitable gear train 40. A cam follower 42 connected to the strip guide 33 engages a groove 38a in the surface of cam 38. Groove 38a is of such a configuration that during rotation of the winding drum 31, guide 33 reciprocates across drum surface 32 transversely to the direction of rotation so that strip 30 is laid in a zigzag pattern over surface 32, the strip being folded back on itself at the edges of the reinforcement.

Gear train 40 includes a gear mechanism 43 to control the positioning of the strip on drum surface 32 during the subsequent rotation of the drum 31 so the strip being laid on the surface is in a predetermined position with respect to other strip lengths. This control of the strip lay-down provides for the achievement of the desired pattern in the reinforcement and provides for the formation of a complete reinforcement, i.e., a belt in which the strip spacing and configuration is substantially uniform and in accordance with the preselected pattern.

In a preferred procedure for forming a reinforcement strip of the invention employing the apparatus shown in FIG. 6, winding drum 31 is continuously rotated to draw a unitary strip 30 including a multiplicity of tire cords (not shown) over a guide 44, through guide 33 and onto drum surface 32. Simultaneously, the guide 33 reciprocates with respect to the surface of the drum 31 to lay the strip in a zigzag pattern on the surface thereof. As guide 33 approaches an edge of the drum surface, the movement of the guide is reversed by the cam 38 so as to fold the strip back on itself and provide a reversal of the strip pattern across the surface 32 in an opposite direction. The relationship of the speed of rotation of the drum 31 with respect to the movement of guide means 33 determines the strip pattern of the reinforcement. The winding of the strip on the surface is continued until the surface is substantially covered. In this way an endless reinforcement is formed from a continuous strip.

The invention will be described in greater detail with reference to the following examples which are intended to illustrate the invention without restricting the scope thereof.

EXAMPLE I

A reinforcement for a pneumatic tire is made on an apparatus as shown in FIG. 6 employing the following procedure. The circumference of the reinforcement is 47.9 inches and the width thereof is 9.8 inches. The angle of the strip is 60°. A belt as shown in FIG. 1 of the drawings is formed by winding a rubber coated cord strip 1.1 inches wide and 0.060 inches thick containing 21 brass plated steel cords about 0.024 inches in diameter, 9 revolutions of the drum with 4⅔ cycles of the cord guide per drum revolution, one cycle being a return to the original position.

The endless reinforcement is applied to a flat band tire carcass and tread and sidewall-forming rubber stock is placed over the breaker. The flat band assembly is shaped in the form of a torus under heat and pressure and vulcanized to form a tire. During the shaping process the circumference of the reinforcement is increased to about 74 inches and the width thereof reduced to about 5 inches. The cord angle is about 24° as measured from an edge.

EXAMPLE II

The procedure of this example is the same as that of Example I except that the circumference of the reinforcement is 50.4 inches. A belt similar to that shown in FIG. 3 is formed from a rubber covered cord strip 1.1 inches wide and 0.060 inch thick containing 28 brass plated steel cords about 0.024 inch diameter, after 9 drum revolutions with 4⅙ cycles of the cord guide per revolution.

EXAMPLE III

The procedure of this example is the same as that of Example I except that the reinforcement has a circumference of 120 inches, a width of 7.2 inches and a strip of 24°. A reinforcement is formed after 7 revolutions of the drum with 3 5/7 cycles of the guide per drum revolution, from a strip 1.9 inches wide and 0.080 inch thick containing 31 brass plated steel cords 0.040 inch in diameter. This reinforcement is used in a tire retreading operation by applying the reinforcement over a tire from which the tread has been buffed. Thereafter, tread stock is applied over the belt, and the assembly is vulcanized to form a retread truck tire.

The above description, drawings and examples show that the present invention provides a novel reinforcement for a pneumatic tire which overcomes the disadvantages of bias-cut fabric reinforcements and the problems of endless cord reinforcements heretofore known. The construction of the reinforcement of the invention substantially eliminates cord to cord contact during manufacture and use which can result in premature tire failure. The reinforcement of the invention provides a high degree of flexibility in the configuration and dimensions which can be employed. Furthermore, the reinforcement of the invention is useful both for new tires and for retread tires. For new tires the reinforcement of the invention is not only useful in radial type tires where the reinforcement is applied after the carcass is shaped into the form of a torus, but also the belt is particularly suitable for use in tires made by flat band building methods in which the reinforcement is applied to the carcass in flat band form and expanded during the carcass shaping procedure. A further advantage of the reinforcement of the invention is the high degree of balance and symmetry which can be achieved in tires incorporating the reinforcement. This is due to the fact that the reinforcement is without a splice and also that the reinforcement does not contain separate plies which can create shear planes and transverse forces or side-thrust in a running tire.

While the above description has been directed primarily to an endless reinforcement for various types of tires it will be apparent that the present invention may be utilized to provide reinforcements for other endless reinforced products such as drive belts, conveyor belts, snowmobile belts and similar products. Also, the reinforcement of the invention is useful for the production of other cord components of a tire, for example, for the carcass itself or for a unitized breaker/carcass assembly. The reinforcement can be wound over a carcass or applied thereto in flat band form and expanded, e.g., to produce a belted bias ply tire, or wound over or applied to an expanded carcass such as in the production of a radial ply tire. Furthermore, the reinforcement can be used with a tire from which the tread has been removed, new tread stock applied and vulcanized to form a retread tire.

It will be apparent to one skilled in the art that various modifications and variations in the procedures, materials and apparatus can be made within the scope of the invention. For example, while a single reinforcement will generally replace a conventional two-ply breaker belt, more than one reinforcement or a reinforcement of extra thickness may be advantageous in certain applications. Therefore, the foregoing description, drawings and examples are intended to illustrate the preferred embodiments of the invention, and the scope of the invention is to be limited only by the following claims.

That which is claimed is:

1. An endless reinforcement which comprises a unitary strip including a multiplicity of continuous cords, the strip being positioned across the width of the reinforcement from one side to the other at an angle to the edges of the reinforcement in a plurality of wraps with successive lengths of the strip being folded with respect to each other at the edges in a generally zigzag pattern to form a reinforcement of substantially uniform thickness, with the cords of said unitary strip being in contiguous relationship throughout the entire length of said unitary strip.

2. An endless reinforcement according to claim 1 wherein the cords are associated with rubber.

3. An endless reinforcement according to claim 1 wherein the width of the strip is not more than about one fifth of the perpendicular spacing between adjacent parallel lengths of the strip which are connected by an intermediate strip length disposed at a substantially different angle.

4. An endless reinforcement according to claim 3 wherein the width of the strip is between about one half and six inches.

5. An endless reinforcement according to claim 3 wherein the width of the strip is between about one half and two and on half inches.

6. An endless reinforcement according to claim 1 wherein the cords within the unitary strip are disposed in a single plane.

7. An endless reinforcement according to claim 1 wherein the strip is disposed at an angle between about 50° and 80° as measured from an edge of the reinforcement.

8. An endless reinforcement according to claim 1 wherein the strip is disposed at an angle between about 5° and 35° as measured from an edge of the reinforcement.

9. An endless reinforcement according to claim 2 wherein the rubber of the strip is at least partially vulcanized.

10. An endless reinforcement according to claim 1 wherein the reinforcement comprises more than one strip.

11. An endless reinforcement according to claim 1 wherein the cords are metal wire.

12. A method of producing an endless reinforcement which comprises positioning a unitary strip including a multiplicity of continuous cords, across the width of said reinforcement from one side to the other at an angle to the edges of the reinforcement in a plurality of wraps and folding the strip adjacent each edge of the reinforcement to reverse the direction of said strip in a generally zigzag pattern to form a reinforcement of substantially uniform thickness, with the cords of said unitary strip being in contiguous relationship throughout the entire length of said unitary strip.

13. A method according to claim 12 wherein said unitary strip is formed by associating rubber with said continuous cords.

14. A method according to claim 13 wherein the rubber of the strip is at least partially vulcanized.

15. A method according to claim 12 wherein said unitary strip is preconditioned prior to being positioned across the width of the reinforcement.

16. A method according to claim 12 wherein more than one strip is employed to form the reinforcement.

17. A method according to claim 12 wherein the strip is positioned across the width of the reinforcement at an angle between about 50° and 80° as measured from an edge of the reinforcement.

18. A method according to claim 12 wherein the strip is positioned across the width of the reinforcement at an angle between about 5° and 35° as measured from an edge of the reinforcement.

19. A tire including the endless reinforcement of claim 1.

References Cited
UNITED STATES PATENTS

| | | | |
|---|---|---|---|
| 3,024,828 | 3/1962 | Smith et al. | 152—361 |
| 3,563,296 | 2/1971 | Wells | 152—361 |
| 3,024,829 | 3/1962 | Cooper | 152—361 |
| 3,589,426 | 6/1971 | Varner | 152—361 |
| 3,422,874 | 1/1969 | Weitzel | 152—361 |
| 2,982,327 | 5/1962 | Vanzo et al. | 152—361 |

WILLIAM A. POWELL, Primary Examiner

J. J. BELL, Assistant Examiner

U.S. Cl. X.R.

152—123, 169, 181, 361, 433, 443; 161—58, 144